(12) United States Patent
Teramoto (10) Patent No.: US 9,279,060 B2
(45) Date of Patent: Mar. 8, 2016

(54) INK COMPOSITION, INK JET RECORDING APPARATUS, AND INK JET RECORDING SYSTEM

(71) Applicant: Seiko Epson Corporation, Tokyo (JP)

(72) Inventor: Ryosuke Teramoto, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 268 days.

(21) Appl. No.: 13/955,578

(22) Filed: Jul. 31, 2013

(65) Prior Publication Data

US 2014/0146109 A1 May 29, 2014

(30) Foreign Application Priority Data

Nov. 29, 2012 (JP) ................. 2012-260745

(51) Int. Cl.
*B41J 2/01* (2006.01)
*C09D 11/328* (2014.01)
*B41J 2/21* (2006.01)
*C09D 11/38* (2014.01)
*B41J 2/14* (2006.01)

(52) U.S. Cl.
CPC ........... *C09D 11/328* (2013.01); *B41J 2/14274* (2013.01); *B41J 2/2107* (2013.01); *C09D 11/38* (2013.01)

(58) Field of Classification Search
CPC ........... B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; B41J 2/17509; B41J 2/17513; B41J 2/175; B41J 2/17596; B41J 2/17523; B41J 2/17556; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ............... 347/100, 95, 96, 85, 84, 86, 88, 99, 347/101, 102, 20, 21, 9; 106/31.27, 31.6, 106/31.13; 523/160, 161
See application file for complete search history.

(56) References Cited

U.S. PATENT DOCUMENTS

| 5,972,082 | A | 10/1999 | Koyano et al. | |
|---|---|---|---|---|
| 6,499,836 | B1 * | 12/2002 | Usui et al. | 347/70 |
| 2010/0194837 | A1 * | 8/2010 | Ohshima et al. | 347/102 |

FOREIGN PATENT DOCUMENTS

| JP | 5-125314 B2 | 5/1993 |
|---|---|---|
| JP | 5-125315 B2 | 5/1993 |
| JP | 10-130556 A | 5/1998 |

*Primary Examiner* — Manish S Shah
(74) *Attorney, Agent, or Firm* — Nutter McClennen & Fish LLP; John J. Penny, Jr.

(57) ABSTRACT

An ink composition is used in an ink jet recording apparatus including a recording head that includes a nozzle plate having a nozzle aperture through which the ink composition is ejected, and a flow channel substrate having a communication hole acting as a flow channel through which the ink composition flows. The nozzle plate and the flow channel substrate are bonded together with an adhesive such that the communication hole communicates with the nozzle aperture. The ink composition contains a coloring material, an acetylene glycol-based surfactant having an HLB value of 9 or less, and at least one of the compounds expressed by general formula (1): $R^1O—(CH_2—CH_2—O)_n—R^2$ or general formula (2): $(R^3)_p—N-\{L-(COOM)_q\}_r$.

7 Claims, 6 Drawing Sheets

INK COMPOSITION, INK JET RECORDING APPARATUS, AND INK JET RECORDING SYSTEM

BACKGROUND

1. Technical Field

The present invention relates to an ink composition, an ink jet recording apparatus and an ink jet recording system.

2. Related Art

There has been known an ink jet recording apparatus that ejects very small droplets of an ink composition through nozzles of a recording head onto a recording medium to form images or characters for recording information. The ink composition used for such recording is typically an ink jet ink composition containing various constituents such as a coloring material, a surfactant, water and an organic solvent.

For performing ink jet recording, various characteristics are required of the ink composition, the recording apparatus, the recording medium and so forth. For example, in order to prevent the degradation of recording quality resulting from unstable ejection of the ink composition, it is desirable that air bubbles be not easily formed in the ink composition in the ink jet recording apparatus.

For example, JP-A-10-130556 discloses an ink composition containing an anionic surfactant having a polyoxyethylene alkyl ether acetate skeleton, or a nonionic surfactant having an alkylolefindiol skeleton. According to this patent document, the ink composition in an ink flow channel of a recording apparatus allows air bubbles therein to be easily removed when the ink flow channel is made of a plastic. JP-A-05-125314 and JP-A-05-125315 teach that an ink composition whose wettability to the flow channel has been enhanced by adding a dye capable of acting as a surfactant and a monohydric alcohol to the ink composition allows air bubbles therein to be easily removed and can satisfactorily fill the flow channel without forming bubbles.

On the other hand, recording heads having a high-density structure are developed for high density recording. Accordingly, various components of ink jet recording apparatuses are being made of silicon materials, which are easy to microfabricate. The art disclosed in JP-A-10-130556 is effective in the use of hydrophobic plastic flow channels. It is however thought that the ink composition cannot exhibit sufficient wettability to a silicon member or any other hydrophilic member, and that air bubbles are not sufficiently removed. In the art disclosed in JP-A-05-125314 and JP-A-05-125315, the dye acts as at least part of the surfactant in the ink composition. Therefore, the wettability of the ink composition is likely to be insufficient to the components of a high-density recording head. Also, in JP-A-05-125314 and JP-A-05-125315, dyes that can act as surfactant are used in color ink compositions. Therefore, applicable dyes are limited, and the hue of the color ink composition is not sufficiently adjusted.

SUMMARY

An advantage of some aspects of the invention is that it provides an ink composition that allows air bubbles formed therein to be easily removed. Another advantage of some aspects of the invention is that it provides an ink composition that allows air bubbles therein to be easily removed even if the recording head has a structure liable to retain the air bubbles. Still another advantage is that it provides an ink jet recording apparatus and an ink jet recording system that can easily remove bubbles even if air bubbles are formed in the ink composition.

The following embodiments can solve at least part of the issue described above.

Application 1

According to an aspect of the invention, an ink composition is provided for an ink jet recording apparatus including a recording head that includes a nozzle plate having a nozzle aperture through which the ink composition is ejected, and a flow channel substrate having a communication hole acting as a flow channel through which the ink composition flows. The nozzle plate and the flow channel substrate are bonded together with an adhesive such that the communication hole communicates with the nozzle aperture. The ink composition contains a coloring material, an acetylene glycol-based surfactant having an HLB value of 9 or less, and at least one of compounds expressed by general formula (1) and compounds expressed by general formula (2):

$$R^1O-(CH_2-CH_2-O)_n-R^2 \qquad (1)$$

$$(R^3)_p-N-\{L-(COOM)_q\}_r \qquad (2)$$

In general formula (1), n represents an integer in the range of 4 to 8, $R^1$ represents a component selected from the group consisting of hydrogen and alkyl groups having a carbon number in the range of 1 to 3, and $R^2$ represents an alkyl group having a carbon number in the range of 6 to 8. In general formula (2), $R^3$ represents a component selected from the group consisting of hydrogen, alkyl groups, aryl groups, and heterocycles. L represents a divalent or higher-valent linking group. M represents a component selected from the group consisting of hydrogen, alkali metals, an ammonium group, protonated organic amines, nitrogen-containing heterocycles, and quaternary ammonium cations, or is not present when the COO group in general formula (2) is a counterion of the ammonium ion including the N of general formula (2). p Represents an integer in the range of 0 to 4, q represents an integer of 1 or more, and r represents an integer in the range of 1 to 4. In this instance, p+r is 3 or 4, and when p+r is 4, N is a nitrogen atom of a quaternary ammonium compound. When p is 2 or more, $R^3$ may be the same as or different from each other. When q is 2 or more, M may be the same as or different from each other. When r is 2 or more, $L-(COOM)_q$ may be the same as or different from each other.

In the use of the ink composition, air bubbles formed in the ink composition can be easily removed from the ink composition. Thus, air bubbles are not retained much in the above-described ink jet recording apparatus, and consequently, the ink composition can be stably ejected.

Application 2

The cross section of the communication hole parallel to the surface of the nozzle plate may have the largest area at the position where the communication hole joins with the nozzle aperture.

The ink composition allows air bubbles formed therein to be easily removed. Accordingly, even if the recording head has a structure in which air bubbles are not easily removed, for example, a structure in which the cross section of the communication hole parallel to the surface of the nozzle plate has a largest area at the position where the communication hole joins with the nozzle aperture, air bubble are not much retained.

Application 3

The flow channel substrate may have an indentation at a position close to the communication hole where the flow channel substrate is bonded to the nozzle plate.

The ink composition allows air bubbles formed therein to be easily removed. Accordingly, even if the recording head has a structure in which air bubbles are not easily removed due to the presence of an indentation at the communication hole, the ink composition can be stably ejected.

Application 4

The flow channel substrate may have a longitudinal pressure chamber that joins with the communication hole at one end thereof, and the indentation extends from the communication hole in a longitudinal direction of the pressure chamber.

The ink composition allows air bubbles formed therein to be easily removed. Accordingly, even if the recording head has a structure in which air bubbles are not easily removed, for example, a structure in which the indentation lies at a position where the flow rate of the ink composition does not increase easily.

Application 5

The cross section of the communication hole parallel to the nozzle plate may change discontinuously at a position in a direction in which the distance between the cross section and the nozzle plate increases.

The ink composition allows air bubbles formed therein to be easily removed even if the recording head has a structure in which air bubbles are not easily removed, for example, a structure in which the area of the cross section of the communication hole parallel to the nozzle plate changes discontinuously at a position in a direction in which the distance between the cross section and the nozzle plate increases.

Application 6

According to another aspect of the invention, an ink jet recording apparatus is provided which includes a recording head that includes a nozzle plate having a nozzle aperture through which an ink composition is ejected, and a flow channel substrate having a communication hole acting as a flow channel through which the ink composition flows. The nozzle plate and the flow channel substrate are bonded together with an adhesive such that the communication hole communicates with the nozzle aperture. The ink composition contains a coloring material, an acetylene glycol-based surfactant having an HLB value of 9 or less, and at least one of compounds expressed by general formula (1) and compounds expressed by general formula (2):

$$R^1O-(CH_2-CH_2-O)_n-R^2 \quad (1)$$

$$(R^3)_p-N-\{L-(COOM)_q\}_r \quad (2)$$

In general formula (1), n represents an integer in the range of 4 to 8, $R^1$ represents a component selected from the group consisting of hydrogen and alkyl groups having a carbon number in the range of 1 to 3, and $R^2$ represents an alkyl group having a carbon number in the range of 6 to 8. In general formula (2), $R^3$ represents a component selected from the group consisting of hydrogen, alkyl groups, aryl groups, and heterocycles. L represents a divalent or higher-valent linking group. M represents a component selected from the group consisting of hydrogen, alkali metals, an ammonium group, protonated organic amines, nitrogen-containing heterocycles, and quaternary ammonium cations, or is not present when the COO group in general formula (2) is a counterion of the ammonium ion including the N of general formula (2). p Represents an integer in the range of 0 to 4, q represents an integer of 1 or more, and r represents an integer in the range of 1 to 4. In this instance, p+r is 3 or 4, and when p+r is 4, N is a nitrogen atom of a quaternary ammonium compound. When p is 2 or more, $R^3$ may be the same as or different from each other. When q is 2 or more, M may be the same as or different from each other. When r is 2 or more, L-(COOM)$_q$ may be the same as or different from each other.

The ink jet recording apparatus allows air bubbles formed in the ink composition to be easily removed, and thus can stably eject the ink composition. Accordingly, images can be satisfactorily formed with ink missing suppressed.

Application 7

According to still another aspect of the invention, an ink jet recording system including an ink jet recording apparatus and an ink composition is provided. The ink jet recording apparatus includes a recording head that includes a nozzle plate having a nozzle aperture through which the ink composition is ejected, and a flow channel substrate having a communication hole acting as a flow channel through which the ink composition flows. The nozzle plate and the flow channel substrate are bonded together with an adhesive such that the communication hole communicates with the nozzle aperture. The ink composition contains a coloring material, an acetylene glycol-based surfactant having an HLB value of 9 or less, and at least one of compounds expressed by general formula (1) and compounds expressed by general formula (2):

$$R^1O-(CH_2-CH_2-O)_n-R^2 \quad (1)$$

$$(R^3)_p-N-\{L-(COOM)_q\}_r \quad (2)$$

In general formula (1), n represents an integer in the range of 4 to 8, $R^1$ represents a component selected from the group consisting of hydrogen and alkyl groups having a carbon number in the range of 1 to 3, and $R^2$ represents an alkyl group having a carbon number in the range of 6 to 8. In general formula (2), $R^3$ represents a component selected from the group consisting of hydrogen, alkyl groups, aryl groups, and heterocycles. L represents a divalent or higher-valent linking group. M represents a component selected from the group consisting of hydrogen, alkali metals, an ammonium group, protonated organic amines, nitrogen-containing heterocycles, and quaternary ammonium cations, or is not present when the COO group in general formula (2) is a counterion of the ammonium ion including the N of general formula (2). p Represents an integer in the range of 0 to 4, q represents an integer of 1 or more, and r represents an integer in the range of 1 to 4. In this instance, p+r is 3 or 4, and when p+r is 4, N is a nitrogen atom of a quaternary ammonium compound. When p is 2 or more, $R^3$ may be the same as or different from each other. When q is 2 or more, M may be the same as or different from each other. When r is 2 or more, L-(COOM)$_q$ may be the same as or different from each other.

The ink jet recording system allows air bubbles formed in the ink composition to be easily removed. Accordingly, air bubbles are not much retained in the system, and consequently, the ink composition can be stably ejected.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will now be described. The following embodiments will be described by way of example. The invention is not limited to the following embodiments, and various modifications may be made within the scope and spirit of the invention. All the components disclosed in the following embodiments are not required for the invention.

1. Ink Composition

The ink composition according to an embodiment of the invention contains a coloring material, an acetylene glycol-based surfactant having an HLB (Hydrophile-Lipophile Balance) value of 9 or less, and at least one of the compounds expressed by general formula (1) or general formula (2):

$$R^1O\text{—}(CH_2\text{—}CH_2\text{—}O)_n\text{—}R^2 \quad (1)$$

$$(R^3)_p\text{—}N\text{-}\{L\text{-}(COOM)_q\}_r \quad (2)$$

In general formula (1), n represents an integer in the range of 4 to 8, $R^1$ represents a component selected from the group consisting of hydrogen and alkyl groups having a carbon number in the range of 1 to 3, and $R^2$ represents an alkyl group having a carbon number in the range of 6 to 8. In general formula (2), $R^3$ represents a component selected from the group consisting of hydrogen, alkyl groups, aryl groups, and heterocycles. L represents a divalent or higher-valent linking group. M represents a component selected from the group consisting of hydrogen, alkali metals, an ammonium group, protonated organic amines, nitrogen-containing heterocycles, and quaternary ammonium cations, or is not present when the COO group in general formula (2) is a counterion of the ammonium ion including the N of general formula (2). p Represents an integer in the range of 0 to 4, q represents an integer of 1 or more, and r represents an integer in the range of 1 to 4. In this instance, p+r is 3 or 4, and when p+r is 4, N is a nitrogen atom of a quaternary ammonium compound. When p is 2 or more, $R^3$ may be the same as or different from each other. When q is 2 or more, M may be the same as or different from each other. When r is 2 or more, L-$(COOM)_q$ may be the same as or different from each other.

1.1. Coloring Material

The ink composition contains a coloring material. The coloring material is not particularly limited and may be a dye or a pigment. The dye may be selected from various types of dye generally used for ink jet recording, and examples of the dye include direct dyes, acid dyes, food dyes, basic dyes, reactive dyes, disperse dyes, vat dyes, and soluble vat dyes. The pigment that can be used in the ink composition may be an inorganic pigment or an organic pigment. Exemplary inorganic pigments include titanium oxide, iron oxide, and carbon blacks produced by known methods, such as the contact method, the furnace method, and the thermal method. Exemplary organic pigments include azo pigments, such as azo lake, insoluble azo pigments, condensed azo pigments, and chelate azo pigments; polycyclic pigments, such as phthalocyanine pigments, perylene pigments, perinone pigments, anthraquinone pigments, and quinofuralone pigments; dye chelates, such as basic dye chelates and acid dye chelates; nitro pigments; nitroso pigments; and aniline black.

The hue of the ink composition is not particularly limited, and may be black, white, cyan, magenta or yellow. The color may have a shade or may be mixed. A desired hue can be created by appropriately using one or two or more of the above cited coloring materials. If a pigment is used as the coloring material, a dispersant or a surfactant may be added so that the pigment can be satisfactorily dispersed in the ink composition. The ink composition may be a clear ink.

The coloring material content in the ink composition is not particularly limited, but is preferably in the range of 0.01% to 25% by mass, more preferably 0.1% to 10% by mass.

1.2. Acetylene Glycol-Based Surfactant

The ink composition contains an acetylene glycol-based surfactant having an HLB value of 9 or less.

In an ink composition, an acetylene glycol-based surfactant helps the ink composition penetrate the recording medium. In addition, acetylene glycol-based surfactants are superior to the other surfactants in appropriately controlling the surface tension and the interface tension, and are hardly foam. Furthermore, combined use of an acetylene glycol-based surfactant having an HLB value of 9 or less and at least one of the compounds expressed by general formula (1) or (2) produces the synergistic effect of removing air bubbles effectively.

Acetylene glycol-based surfactants that can be used in the ink composition may be expressed by general formula (a):

In general formula (a), $R^4$, $R^5$, $R^6$ and $R^7$ each represent a linear, cyclic or branched alkyl group having a carbon number in the range of 1 to 6, and $A^1O$ and $A^2O$ each represent oxyalkylene group having a carbon number of 2 or 3, such as oxyethylene or oxypropylene, or a polyoxyalkylene group produced by the polymerization or copolymerization of alkylene oxide having a carbon number of 2 or 3, such as polyoxyethylene, polyoxypropylene, or polyoxyethylenepropylene. n And m each represent the number of repetitions of the $A^1O$ or $A^2O$ unit, that is, oxyalkylene, and satisfy the relationships $0 \leq n < 30$, $0 \leq m < 30$, and $0 \leq n+m < 50$.

Exemplary acetylene glycol-based surfactants include 2,4,7,9-tetramethyl-5-decyne-4,7-diol, 3,6-dimethyl-4-octyne-3,6-diol, and 3,5-dimethyl-1-hexyne-3-ol. Commercially available products may be used, such as Surfynols 104, 104E, 104H, 104A, 104BC, 104DPM, 104PA, 104PG50, 104S, 420, 440, 465, 485, SE, SE-F, 504, 61, 604, 607, 2502, 82, DF37, DF110D, CT111, CT121, CT131, CT136, TG and GA (each, product of Air Products and Chemicals Inc.), Olfines B, Y, P, A, STG, SPC, E1004, E1010, PD-001, PD-002W, PD-003, PD-004, EXP. 4001, EXP. 4036, EXP. 4051, AF-103, AF-104, AK-02, SK-14 and AE-3 (each, product of Nissin Chemical Industry), and Acetylenols E00, E00P, E40 and E100 (each, product of Kawaken Fine Chemicals).

In the ink composition of the present embodiment, an acetylene glycol-based surfactant having an HLB value of 9 or less is used.

The HLB value mentioned herein refers to the value obtained by the Griffin method, using the following equation:

HLB value=20×(sum of the formula weights of hydrophilic groups/molecular weight)

Hence, the HLB value lies within the range of 0 to 20. The higher the HLB value is, the more hydrophilic the surfactant is; the lower the HLB value is, the more hydrophobic the surfactant is.

For example, acetylene glycol-based surfactants having an HLB value of 9 or less include Surfynol 104PG50 (HLB value=4), Surfynol 104E (HLB value=4), Surfynol 104H (HLB value=4), Surfynol 104A (HLB value=4), Surfynol 104PA (HLB value=4), Surfynol 104S (HLB value=4), Surfynol 420 (HLB value=4), Surfynol 440 (HLB value=8), Surfynol SE (HLB value=6), Surfynol SE-F (HLB value=6), Surfynol 61 (HLB value=6), Surfynol 604 (HLB value=8), Surfynol 607 (HLB value=8), Surfynol 2502 (HLB value=8), Surfynol 82 (HLB value=4), Surfynol DF110D (HLB value=3), and Olfine PD-002W (HLB value=9).

The ink composition of the present embodiment may contain two or more acetylene glycol-based surfactants having an HLB value of 9 or less. Also, the ink composition may contain an acetylene glycol-based surfactant having an HLB value of more than 9.

The content of the acetylene glycol-based surfactant having an HLB value of 9 or less is preferably in the range of 0.01% to 5% by mass, more preferably 0.05% to 2% by mass. By using 0.01% by mass or more of an acetylene glycol-based surfactant having an HLB value of 9 or less in combination with at least one of the compounds expressed by general formula (1) or (2), the ink composition can sufficiently penetrate recording media and allows air bubbles to be removed more effectively.

1.3. Compound Expressed by General Formula (1)

The ink composition of the present embodiment contains at least one of the compounds expressed by the following general formula (1) or general formula (2) described later.

$$R^1O-(CH_2-CH_2-O)_n-R^2 \quad (1)$$

In general formula (1), n represents an integer in the range of 4 to 8, $R^1$ represents a component selected from the group consisting of hydrogen and alkyl groups having a carbon number in the range of 1 to 3, and $R^2$ represents an alkyl group having a carbon number in the range of 6 to 8.

If the compound expressed by general formula (1) (hereinafter referred to as formula (1) compound) is used in the ink composition, a plurality of formula (1) compounds may be added. By combined use of formula (1) compounds, the properties of the ink composition can be precisely controlled.

If a formula (1) compound is added to the ink composition, the formula (1) compound content is in the range of 0.1% to 5% by mass relative to the total mass of the ink composition, and is preferably in the range of 0.5% to 4.5% by mass, more preferably 1% to 4% by mass. Also, the formula (1) compound content may be appropriately set in view of the balance with the effect of other surfactants, such as the above-described acetylene glycol-based surfactant and the below-described compound expressed by general formula (2), on the properties of the ink composition.

Formula (1) compounds include tetraethylene glycol monoalkyl ethers, tetraethylene glycol dialkyl ethers, hexaethylene glycol monoalkyl ethers, hexaethylene glycol dialkyl ethers, octaethylene glycol monoalkyl ethers, and octaethylene glycol dialkyl ethers. More specifically, the Formula (1) compound may be tetraethylene glycol mono-2-ethylhexyl ether, hexaethylene glycol mono-2-ethylhexyl ether, or octaethylene glycol mono-2-ethylhexyl ether.

1.4. Compound Expressed by General Formula (2)

The ink composition of the present embodiment contains at least one of the compounds expressed by the above described general formula (1) or the following general formula (2):

$$(R^3)_p-N-\{L-(COOM)_q\}_r \quad (2)$$

In general formula (2), $R^3$ represents a component selected from the group consisting of hydrogen, alkyl groups, aryl groups, and heterocycles. L represents a divalent or higher-valent linking group. M represents a component selected from the group consisting of hydrogen, alkali metals, an ammonium group, protonated organic amines, nitrogen-containing heterocycles, and quaternary ammonium cations, or is not present when the COO group in general formula (2) is a counterion of the ammonium ion including the N of general formula (2). p Represents an integer in the range of 0 to 4, q represents an integer of 1 or more, and r represents an integer in the range of 1 to 4. In this instance, p+r is 3 or 4, and when p+r is 4, N is a nitrogen atom of a quaternary ammonium compound. When p is 2 or more, $R^3$ may be the same as or different from each other. When q is 2 or more, M may be the same as or different from each other. When r is 2 or more, $L-(COOM)_q$ may be the same as or different from each other.

If the compound expressed by general formula (2) (hereinafter referred to as formula (2) compound) is used in the ink composition, a plurality of formula (1) compounds may be added. By combined use of formula (2) compounds, the properties of the ink composition can be precisely controlled.

If a formula (2) compound is added to the ink composition, the formula (2) compound content is in the range of 0.1% to 5% by mass relative to the total mass of ink composition, and is preferably in the range of 0.5% to 4.5% by mass, more preferably 1% to 4% by mass. Also, the formula (2) compound content may be appropriately set in view of the balance with the effect of other surfactants, such as the above-described acetylene glycol-based surfactant and formula (1) compound, on the properties of the ink composition.

The formula (2) compound is preferably selected from the compounds expressed by the following general formula (3) from the viewpoint of enhancing the fixity of the ink composition to recording media. Formula (3) compounds may be used singly or in combination.

(3)

In general formula (3), $R^8$ to $R^{10}$ each represent an alkyl group having a carbon number in the range of 1 to 20, and X represents a divalent linking group.

The formula (2) compound may be, but is not limited to, the compound expressed by the following general formula (4):

(4)

1.5. Other Constituents

The ink composition may further contain other constituents, such as water, an organic solvent, a (polyhydric) alcohol, a salt, a polymerizable compound, another surfactant, a pH adjuster, a chelating agent such as an ethylenediaminetetraacetic acid salt (EDTA salt), a preservative or fungicide, and a rust preventive, to impart desired properties.

The ink composition containing the above-described constituents allows air bubbles formed therein to be easily removed. Accordingly, air bubbles are not much retained in the recording head and thus the ink composition can be stably ejected even if it is used in an ink jet recording apparatus including a recording head that includes a nozzle plate having a nozzle aperture through which the ink composition is ejected, and a flow channel substrate having a communication hole acting as a flow channel through which the ink composition flows, and that has a structure in which the nozzle plate and the flow channel substrate are bonded together with an adhesive such that the communication hole communicates with the nozzle aperture.

1.6. Application of Ink Composition

The ink composition of the present embodiment is advantageously used in an ink jet recording apparatus including a recording head that includes a nozzle plate having a nozzle aperture through which the ink composition is ejected, and a flow channel substrate having a communication hole acting as a flow channel through which the ink composition flows. In the recording head, the nozzle plate and the flow channel substrate are bonded together with an adhesive in such a manner that the communication hole communicates with the nozzle aperture.

Since the ink composition allows air bubbles formed therein to be easily removed from the ink composition, the above described advantageous effects are markedly produced when the ink composition is used in an ink jet recording apparatus including a recording head having a structure that hinders air bubbles in the ink composition from being removed or eliminated, as in the ink jet recording apparatus described below.

1.7. Ink Jet Recording Apparatus

The ink jet recording apparatus according to an embodiment of the invention includes a recording head from which the ink composition is ejected, and ejects the ink composition onto a medium to record information on the medium. Examples of the medium include, but are not limited to, paper, a plastic film, cloth, book printing paper, metal, glass, and polymer. The medium may be transparent and colorless, translucent, chromatic and transparent, chromatic and opaque, or colorless and opaque.

The ink jet recording apparatus can be applied to textile printing. For example, if the coloring material of the ink composition is a sublimation disperse dye, a sublimation transfer method is applied. Alternatively, the ink jet recording apparatus of the present embodiment may be directly used for textile printing (direct sublimation method) using cloth as the medium. The ink jet recording apparatus may include a transfer mechanism and/or a heating mechanism, depending on how textile printing is performed.

The ink jet recording apparatus may be a serial type or a line type. In either case, the ink jet recording apparatus includes a recording head, and the head ejects droplets of an ink composition in a predetermined volume or mass onto a recording surface of a medium at a predetermined timing while changing the relative position with respect to the medium, and thus deposits the ink composition on the medium to form a predetermined image.

It is not particularly limited how the ink jet recording apparatus records information, as long as the ink composition can be ejected in the form of droplets onto a medium through the nozzle aperture of the recording head. For example, droplets of the ink composition may be ejected by electrostatic suction, a pressure of a pump, use of a piezoelectric element, or allowing the ink composition to bubble with heat using small electrodes.

The ink jet recording apparatus optionally includes an enclosure, a recording head carriage mechanism, a roller, operation portions, a control portions, sensors, a medium transport mechanism, a tray, and a control panel, in addition to the recording head.

Figure 1:
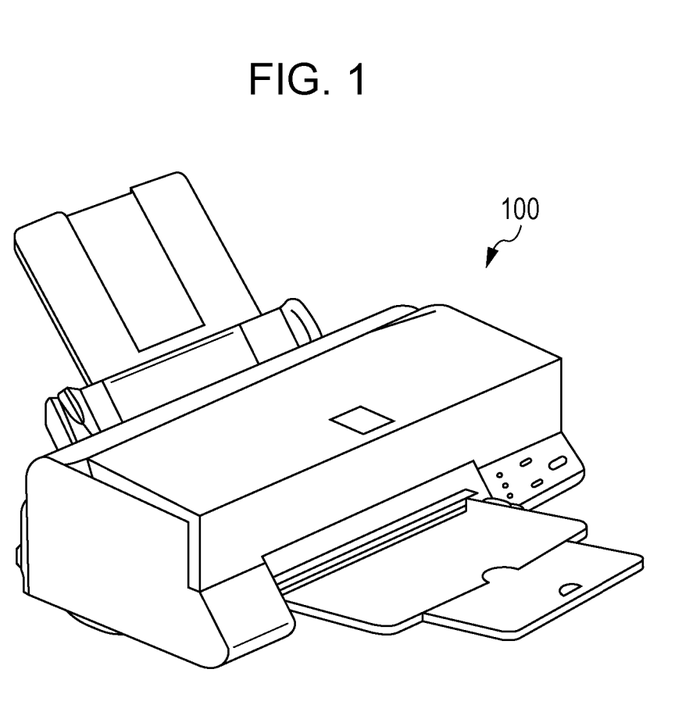
FIG. 1 is a perspective view of an ink jet recording apparatus in which an ink composition according to an embodiment of the invention is used.

FIG. 1 shows an ink jet recording apparatus 100 (serial type) in which the ink composition of an embodiment of the invention is used. The ink jet recording apparatus 100 includes a recording head. The recording head ejects the above-described ink composition onto a predetermined recording medium through a nozzle aperture thereof.

The ink jet recording apparatus allows air bubbles formed in the ink composition to be easily removed, and thus can stably ejects the ink composition. Accordingly, images can be satisfactorily formed with ink missing suppressed.

1.8. Recording Head

The recording head 1 of the ink jet recording apparatus of the present embodiment includes a nozzle plate 16 and a flow channel substrate 17. The nozzle plate 16 and the flow channel substrate 17 are bonded together with an adhesive. The major part of the recording head 1 will now be described.

Figure 2:
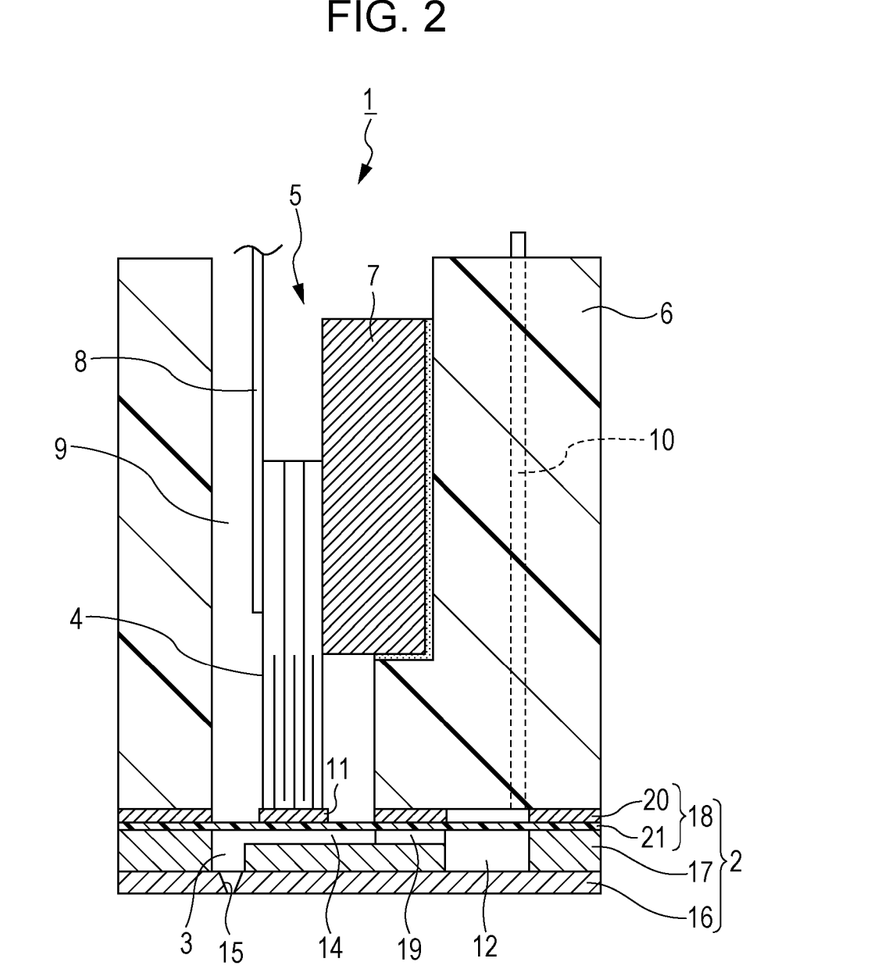
FIG. 2 is a schematic sectional view of a recording head that the ink jet recording apparatus may include, showing major parts of the recording head.
Figure 3A:
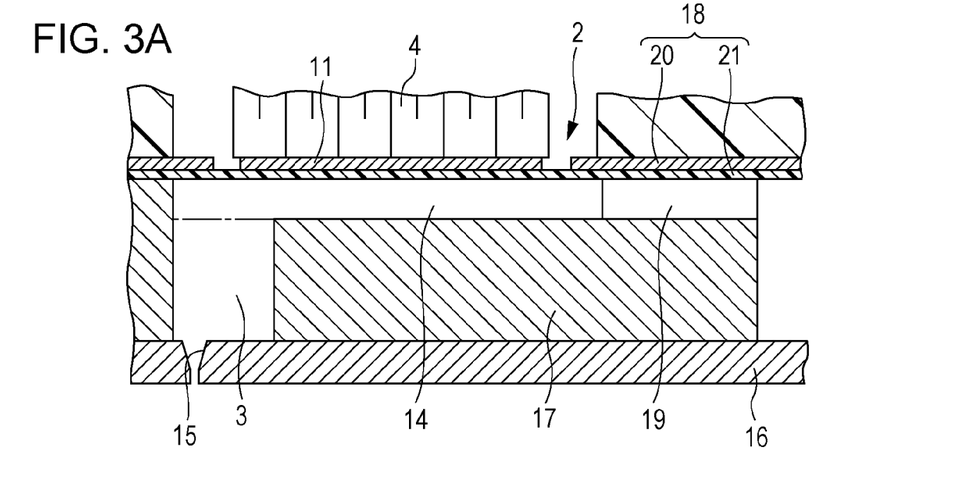
FIGS. 3A to 3C are schematic diagrams illustrating the structure of a flow channel unit of the recording head.
Figure 3B:
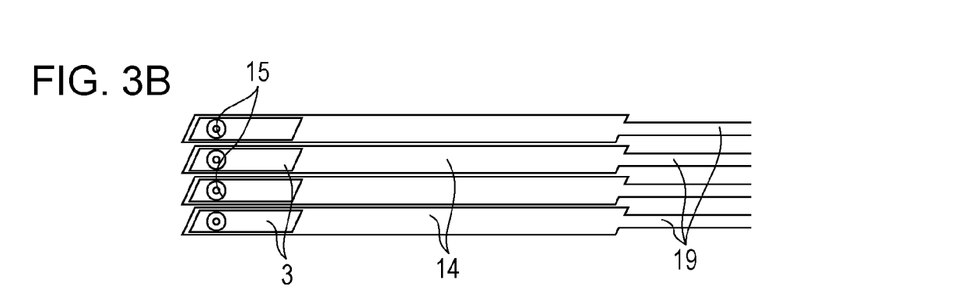
Figure 3C:
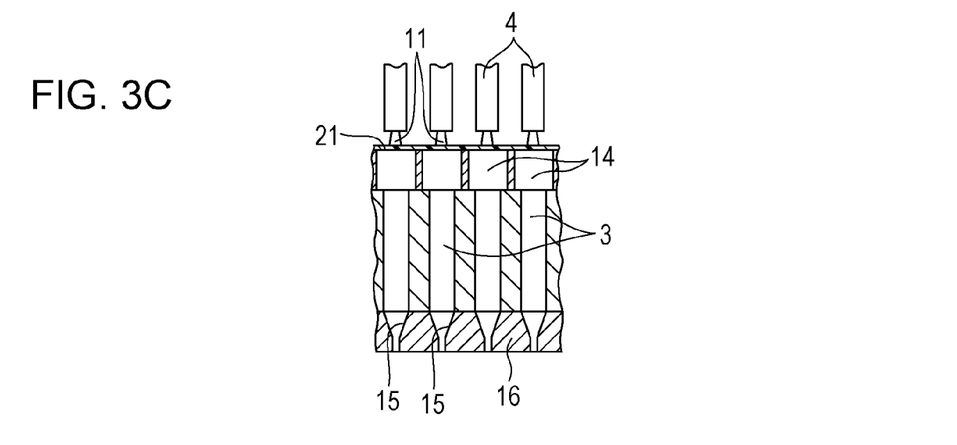
Figure 4:
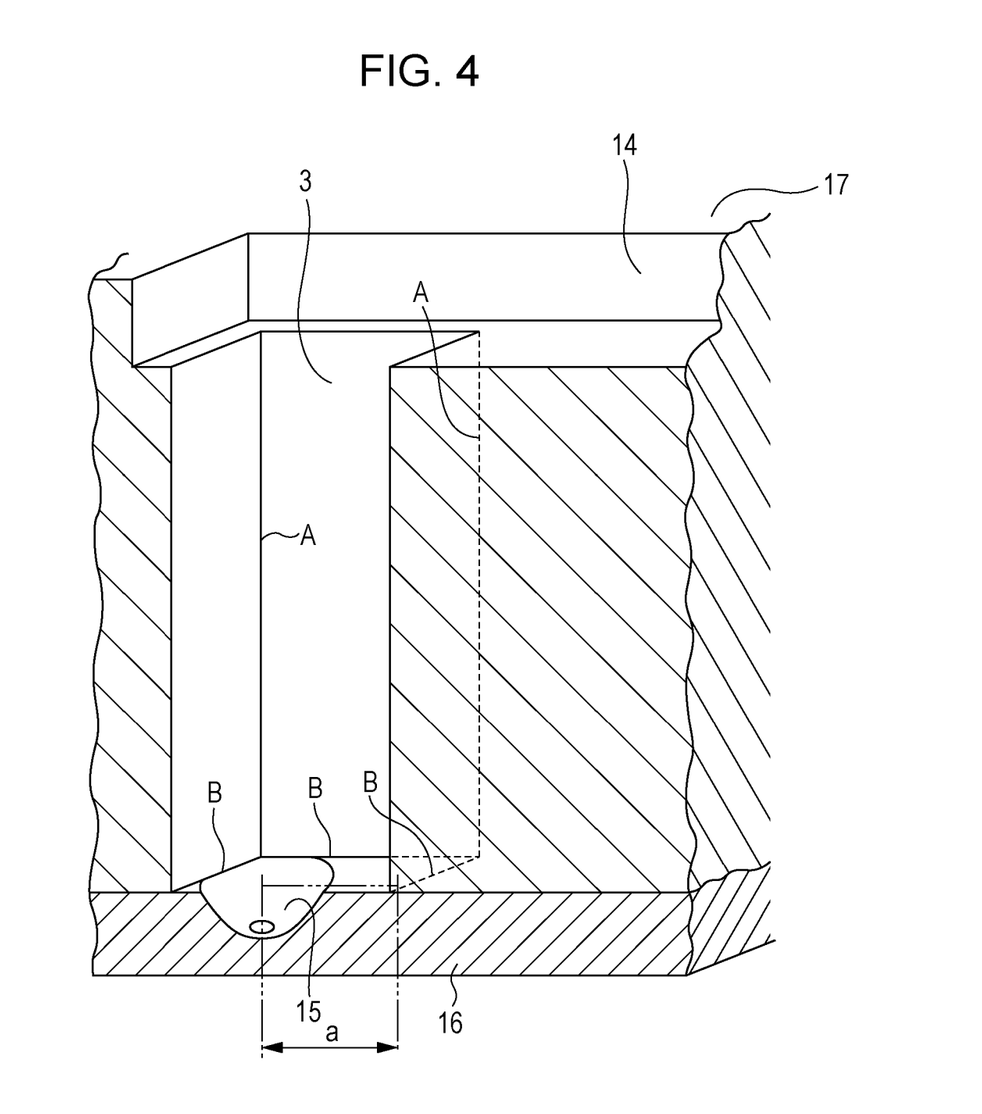
FIG. 4 is a schematic diagram of the structure of a communication hole of the recording head.

FIG. 2 is a schematic sectional view of a major part of the recording head 1. FIGS. 3A to 3C illustrate the structure of a flow channel unit 2. FIG. 4 illustrates the structure of a communication hole 3.

As shown in FIG. 2, the recording head 1 includes a oscillator unit 5 having a plurality of piezoelectric oscillators 4, a case 6 in which the oscillator unit 5 is housed, and a flow channel unit 2 joined to an end of the case 6.

The oscillator unit 5 includes the piezoelectric oscillators 4, a fixing plate 7, and flexible cables 8. Each of the piezoelectric oscillator 4, which is a pressure generating element, is an electromechanical conversion element. The piezoelectric oscillators 4 are in the form comb teeth, each having a width of about 30 to 100 μm. Each of the piezoelectric oscillators 4 is fixed like a cantilever in such a manner that its free end protrudes from the edge of the fixing plate 7. The piezoelectric oscillator 4, which has a multilayer structure including alternately stacked piezoelectric layers and inner electrodes, expands and contracts in a direction perpendicular to the direction in which an electric filed is applied, that is, in a longitudinal direction thereof. When, for example, an oscillation voltage is applied to the piezoelectric oscillator 4, the free end of the piezoelectric oscillator 4 contrasts or expands in the longitudinal direction thereof.

The piezoelectric oscillators 4 are joined to the fixing plate 7. The fixing plate 7 shown in the figures is a heat-dissipating metal plate, and may be a stainless steel plate having a thickness of 0.7 to 1 mm. The flexible cable 8 is a flexible wiring member through which driving signals are transmitted to the corresponding piezoelectric oscillator 4, and is electrically connected to the piezoelectric oscillator 4 at the proximal end of the piezoelectric oscillator 4.

The case 6 is made of a synthetic resin block in which a housing hollow 9 and an ink supply channel 10 are formed. For example, the case 6 may be formed by injection molding of an epoxy resin. The housing hollow 9 is a space in which the oscillator unit 5 is housed. The oscillator unit 5 is fixed to the wall of the housing hollow 9 with the fixing plate 7 bonded to the wall of the housing hollow 9. The distal ends of the piezoelectric oscillators 4 in the housing hollow 9 are located at the open end of the housing hollow 9 and are joined to corresponding island portions 11 of the flow channel unit 2.

The ink supply channel 10 passes through the case 6 from the fixing side of the case 6 to the reservoir 12 so that an ink composition flows therethrough. The ink composition is introduced to the recording head 1 through the ink supply channel 10.

The flow channel unit 2 is a component having discrete ink flow channels running from the reservoir 12 to each nozzle aperture 15 through a corresponding pressure chamber 14. The flow channel unit 2 includes the nozzle plate 16, the flow channel substrate 17 and an elastic plate 18. The nozzle plate 16 is bonded to one surface of the flow channel substrate 17 with an adhesive, and the elastic plate 18 is bonded to the other surface of the flow channel substrate 17. The adhesive is not shown in FIGS. 2 to 4.

The nozzle plate 16 is a thin member in which a plurality of nozzle apertures 15 is formed in a line with a pitch according to the image recording density. In the present embodiment, the nozzle plate 16 is an about 100 μm thick stainless steel plate having 96 nozzle apertures 15 at a pitch of 180 dpi. The nozzle aperture 15 has a diameter of about 40 μm at the thinnest portion. The nozzle apertures 15 aligned in a line define a nozzle line. The number of nozzle lines is set according to the number of ink compositions the recording head can eject. For example, if the recording head 1 can record information including color images, 4 to 7 nozzle lines may be formed in parallel.

The flow channel substrate 17 is a plate having therein a plurality of spaces acting as the pressure chambers 14 and spaces acting as communication holes 3 and reservoirs 12. The spaces acting as the pressure chambers 14 are partitioned corresponding to each of the nozzle apertures 15 of the nozzle plate 16. In the present embodiment, the flow channel substrate 17 is made of a silicon wafer of about 300 μm in thickness subjected to anisotropic etching. In the use of silicon wafer, the pressure chambers 14, the communication holes 3, and ink supply ports 19 can be partitioned with crystal planes. Silicon wafer therefore allows a fine structure to be precisely formed therein. Although each communication hole 3 and the corresponding pressure chamber 14 form a continuous space, they are considered to be different portions divided by a plane parallel to the nozzle plate 16, as indicated by a dotted chain line shown in FIG. 3A, in the present embodiment. More specifically, in the present embodiment, the communication hole 3 is divided from the pressure chamber 14 by a virtual plane extending from and aligned with the surface, parallel to the nozzle plate 16, of the flow channel substrate 17 serving as a wall of the space defining the communication hole 3 and the pressure chambers 14.

As shown in FIG. 3B, each pressure chamber 14 is a thin space extending in a direction perpendicular to the direction of the nozzle line in which the nozzle apertures 15 are aligned, and is in the form of a shallow recess. In the present embodiment, the pressure chamber 14 has a thin, long parallelogrammic shape in plan view due to the crystal plane of the silicon wafer exposed at the surface. The pressure chambers 14 have a length of about 1 to 2 mm and a width of about 100 μm.

Each pressure chamber 14 is provided with the communication hole 3 at the end thereof distant from the reservoir 12. The communication hole 3 passes through the flow channel substrate 17 in the thickness direction. As shown in FIG. 3C, each communication hole 3 connects the pressure chamber 14 to the corresponding nozzle aperture 15, and the nozzle plate 16 and the flow channel substrate 17 are bonded together with an adhesive such that the nozzle apertures 15 communicate with the corresponding communication holes 3. The communication hole 3 also has a thin, long parallelogrammic shape extending in a lateral direction in plan view due to the crystal plane of the silicon wafer, and has a length of about 400 μm in the longitudinal direction of the pressure chamber 14, and a width of about 80 μm, slightly smaller than that of the pressure chamber 14, in the width direction of the pressure chamber 14. The nozzle apertures 15 are formed in the nozzle plate 16, each at a position corresponding to one end of the pressure chamber 14 in the longitudinal direction so as to communicate with the corresponding communication hole 3, as shown in FIG. 3B or FIG. 4.

The ink supply port 19 is a groove formed between the other end of the pressure chamber 14 and the reservoir 12, and has an adequately smaller width than the pressure chamber 14. A set of the ink supply port 19, the pressure chamber 14 and the communication hole 3 defines an ink flow channel.

The elastic plate 18 has a double-layer structure including a support plate 20 and an elastic film 21 disposed on the support plate 20, as shown in FIG. 3A. In the present embodiment, the support plate 20 is a stainless steel plate having a thickness of about 30 μm, and the elastic film 21 is a resin film (for example, a polyphenylene sulfide film) having a thickness of several micrometers. The elastic plate 18 has a diaphragm portion that seals the open side of the pressure chamber 14, and a compliance portion that seals the open side of the reservoir 12. The diaphragm portion is formed by etching the portion of the support plate 20 corresponding to the pressure chamber 14 in a ring manner when viewed from above so as to from an island portion 11 inside the ring.

The compliance portion is formed by partially removing the support plate 20 by etching so that the portion of the elastic plate 18 opposing the reservoir 12 is defined only by the elastic film 21.

In the recording head 1 having the above-described structure, the island portion 11 is pressed toward the nozzle plate 16 by extending the piezoelectric oscillator 4 in its longitudinal direction. The pressure at this time deforms the diaphragm portion of the elastic film 21 so that the pressure chamber 14 contracts. In contrast, by shortening the piezoelectric oscillator 4 in its longitudinal direction, the pressure chamber 14 is expanded due to the elasticity of the elastic film 21. The pressure applied to the ink composition in the pressure chamber 14 is varied by the expansion and contraction of the pressure chamber 14. Thus, droplets of the ink composition can be ejected through the nozzle aperture by controlling the expansion and contraction of the pressure chamber 14.

A process for manufacturing the recording head 1 will now be described. For manufacturing the recording head 1, the case 6, the oscillator unit 5, and the flow channel unit 2 are prepared in advance.

For preparing the oscillator unit 5, an adhesive is applied to the surface of a fixing plate 7 having predetermined dimensions. More specifically, the adhesive is applied in the region to which the oscillators will be bonded by printing or any other technique. The adhesive may be a thermosetting resin adhesive. After the adhesive has been applied, a piezoelectric plate is disposed on the fixing unit 7 in such a manner that a half of a surface of the piezoelectric plate comes in contact with the surface coated with the adhesive. The piezoelectric plate is the base material of the piezoelectric oscillators 4, and is formed by alternately stacking electrode layers and piezoelectric layers. After the piezoelectric plate is disposed, the adhesive between the fixing plate 7 and the piezoelectric plate is cured to secure the piezoelectric plate to the fixing plate 7. Then, the piezoelectric plate is cut into comb teeth, thus forming a plurality of piezoelectric oscillators 4. The piezoelectric plate may be cut with a dicing saw or a wire saw, for example, in such a manner that the piezoelectric plate is cut from the distal end (free end) of the piezoelectric plate, which protrudes from the edge of the fixing plate 7, toward the side close to the fixing plate 7. Then, flexible cables 8 are joined, one each, to the resulting piezoelectric oscillators 4 to complete the oscillator unit 5.

For preparing the flow channel unit 2, the bonding surfaces of the elastic plate 18, flow channel substrate 17 and nozzle plate 16 are treated with a primer, and the plates and substrate are bonded together. For the treatment of the bonding surfaces, a silane coupling agent may be used as the primer. A primer treatment liquid containing about 0.2% by weight of the silane coupling agent is prepared, and the bonding surfaces of the elastic plate 18, the flow channel substrate 17 and the nozzle plates 16 are immersed in the primer treatment liquid for about 60 to 70 minutes. In the present embodiment, the flow channel substrate 17 and the nozzle plate 16 are immersed in a primer treatment liquid containing 0.2% by weight of a silane coupling agent for 60 minutes.

Then, the elastic plate 18 is bonded to one surface of the flow channel substrate 17, and the nozzle plate 16 is bonded to the other surface of the flow channel substrate 17. Thus, the flow channel unit 2 is completed. The adhesive used for bonding plates can be selected from various types, and preferably a thermosetting, flowable adhesive is used, such as two-component epoxy adhesive. For bonding the flow channel substrate 17 and the nozzle plate 16 together, the two plates are aligned so that the nozzle apertures 15 of the nozzle plate 16 communicate, one each, with the communication holes 3 of the flow channel substrate 17.

After the case 6, the oscillator unit 5 and the flow channel unit 2 are prepared, these are assembled. First, the flow channel unit 2 is bonded to one end of the case 6. For example, an adhesive is applied to the end of the case 6. Then, the flow channel unit 2 is disposed on the end of the case 6 and secured with, for example, a pin. For this operation, the adhesive can be selected from various types. An epoxy adhesive may be suitable as in the operation of bonding plates.

After the flow channel unit 2 has been secured, the oscillator unit 5 is inserted into the housing hollow 9 of the case 6. More specifically, for inserting the oscillator unit 5, an adhesive is transferred to the distal ends of the piezoelectric oscillators 4, and the oscillator unit 5 is inserted into the housing hollow 9 with the distal ends in the lead. After the distal ends of the piezoelectric oscillators 4 have come into contact with the island portions 11, an adhesive is applied between the back surface of the fixing plate 7 and the inner wall of the case 6. For this operation, a flowable adhesive having a relatively low viscosity, such as thermosetting epoxy adhesive, is preferably used as the adhesive. The adhesive applied in this operation penetrates into the gap between the fixing plate 7 and the inner wall of the case 6 to fill a bonding region by capillarity.

After the bonding region has been filled, the case 6 is heated. By heating the case 6, the flow channel unit 2 is bonded to the end of the case 6, and the fixing plate 7 of the oscillator unit 5 is bonded to the inner wall of the case 6. Then, other components including a printed circuit board are mounted in the resulting structure, and thus the assembly of the recoding head 1 is completed.

In the operation of bonding the plates, if the amount of the adhesive applied to the surface of the flow channel substrate 17 is excessive, or if the nozzle plate 16 is slightly moved to align with the flow channel substrate 17 before curing the adhesive, the adhesive may be undesirably cured with an excess adhesive or a stray adhesive remaining on an edge of the communication hole 3. The edge of the communication hole 3 refers to, for example, a corner of the communication hole 3 (between two walls, as designated by letter A shown in FIG. 4) or an open end of the communication hole 3 (designated by letter B shown in FIG. 4).

If such an undesired excess or stray adhesive is cured in the flow channel, it can come off from the wall by the stream of the ink composition, thus clogging the nozzle apertures 15. This can cause printing failure.

Figure 5:
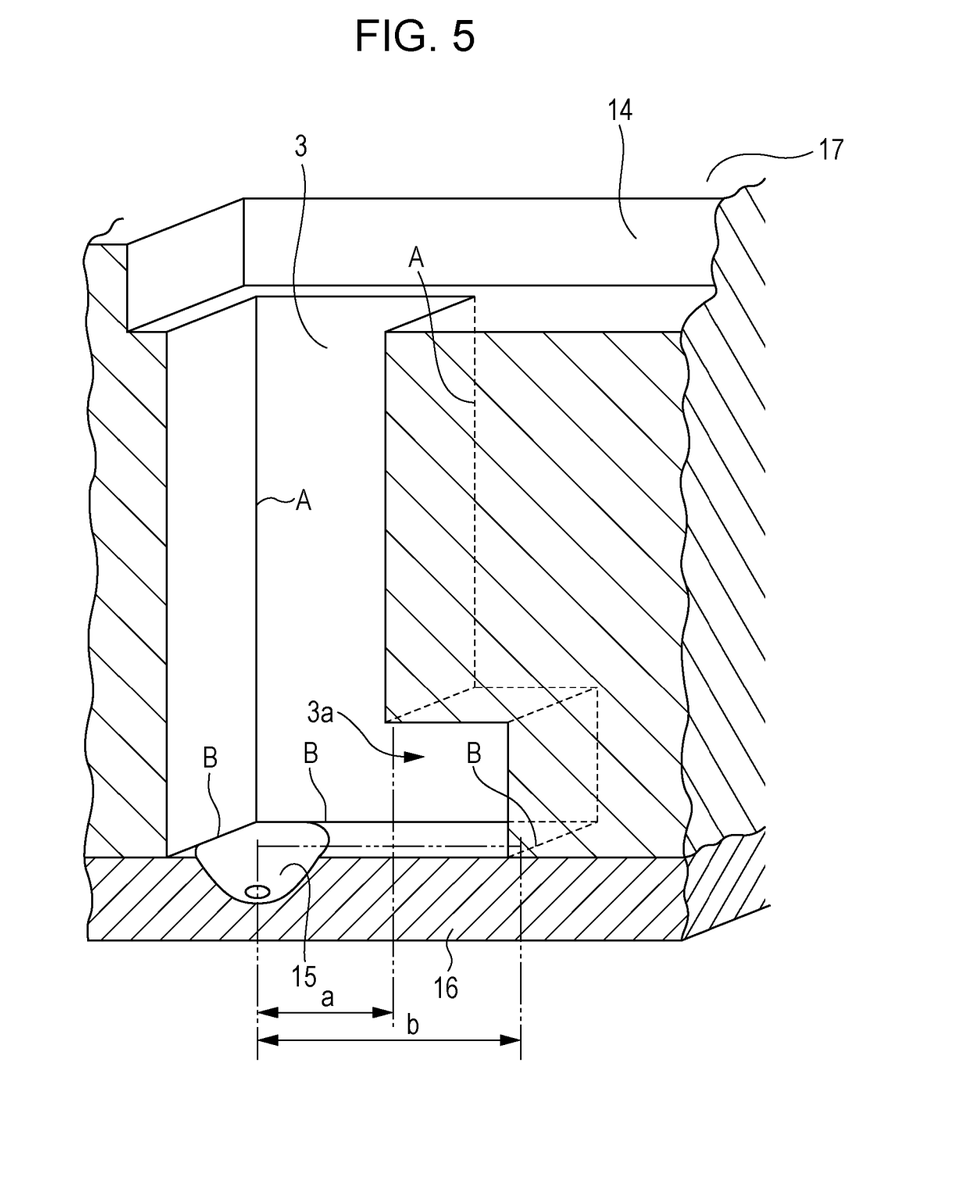
FIG. 5 is a schematic diagram of the structure of a communication hole having an indentation.

Some approaches may be taken to solve this issue. For example, an indentation 3a is formed in the wall of the communication hole 3, as shown in FIG. 5. Since the distance between the excess adhesive and the nozzle aperture 15 is thus increased, printing failure can be reduced. More specifically, in order to reduce printing failure, the flow channel substrate 17 is worked so that the distance from at least one of the edges designated by letter B in FIG. 4 to the nozzle aperture 15 increases, and the worked flow channel substrate 17 is bonded to the nozzle plate 16. In the embodiment shown in FIG. 5, an indentation 3a is formed in the flow channel substrate 17 in such a manner that the edge designated by letter B located, in the longitudinal direction of the pressure chamber 14, closer to the ink supply port 19 lies more distant from the nozzle aperture 15. The indentation 3a is formed in the portion of the flow channel substrate 17 bonded to the nozzle plate 16. It will be appreciated that the indentation 3a may be formed at any of the other edges to increase the distance between the adhesive and the nozzle aperture 15.

The indentation 3a may be in a shape passing in the thickness direction of the flow channel substrate 17 from the nozzle plate 16 to the pressure chamber 14 (shape formed by simply extending the communication hole 3). However, even the shape like the indentation 3a shown in FIG. 5, having a height in the thickness direction of the flow channel substrate 17 from the nozzle plate 16 to an intermediate point between the nozzle plate 16 and the pressure chamber 14 can reduce printing failure without changing the flow of the ink composition at the communication hole 3, which has been precisely designed. In other words, printing failure can be reduced in a structure in which the cross section of the communication hole 3 parallel to the nozzle plate 16 has the largest area at the position where the communication hole 3 joins with the nozzle aperture 15 (position where the flow channel substrate 17 and the nozzle plate 16 are bonded together).

The side wall of the indentation 3a can have any shape without particular limitation. However, in the case where the flow channel substrate 17 is made of silicon wafer, since the flow channel substrate 17 is formed by etching, in FIG. 5, the area of the cross section of the communication hole 3 parallel to the nozzle plate 16 may change suddenly at a position in a direction in which the distance between the section and the nozzle plate 16 increases. For the same reason, the side wall of the indentation 3a may have both a face formed at a high etching rate and a face formed at a low etching rate. In this instance, the area of the cross section of the communication hole 3 parallel to the nozzle plate 16 may change discontinuously at a position in a direction in which the distance between the section and the nozzle plate 16 increases.

By forming an indentation 3a as shown in FIG. 5, the distance between the side wall of the communication hole 3 and the nozzle aperture 15 is increased. For example, if the indentation 3a is not formed (as shown in FIG. 4), the distance from the center line of the nozzle aperture 15 to the edge B located in the longitudinal direction of the pressure chamber 14 (distance designated by letter a in FIG. 4) may be in the range of 5 to 50 µm, and is preferably in the range of 10 to 40 µm. On the other hand, if an indentation 3a is formed (as shown in FIG. 5), the distance from the center line of the nozzle aperture 15 to an edge B (distance designated by letter b in FIG. 5) may be in the range of 30 to 150 μm, and is preferably in the range of 50 to 120 μm, more preferably 70 to 100 μm.

The above-described excess adhesive may be removed from the recording head 1, if necessary, after the completion of assembly. This operation may be performed by, for example, continuously introducing a remover liquid that has been adjusted to an alkaline pH into the ink flow channel in the recording head 1. The remover liquid may be an alkaline solution, such as an aqueous solution of potassium hydroxide or sodium hydrogencarbonate.

The structure and the manufacturing process of the recording head 1 described above are merely an embodiment of the invention. The ink composition of an embodiment of the invention is used in an ink jet recording apparatus 100, as shown in FIG. 1, including a recording head as described above.

1.9. Advantages

The ink composition of an embodiment of the invention allows air bubbles formed therein to be easily removed. This advantage is extremely clearly exhibited when the ink composition is used in an ink jet recording apparatus including a recording head as described above.

Figure 6:
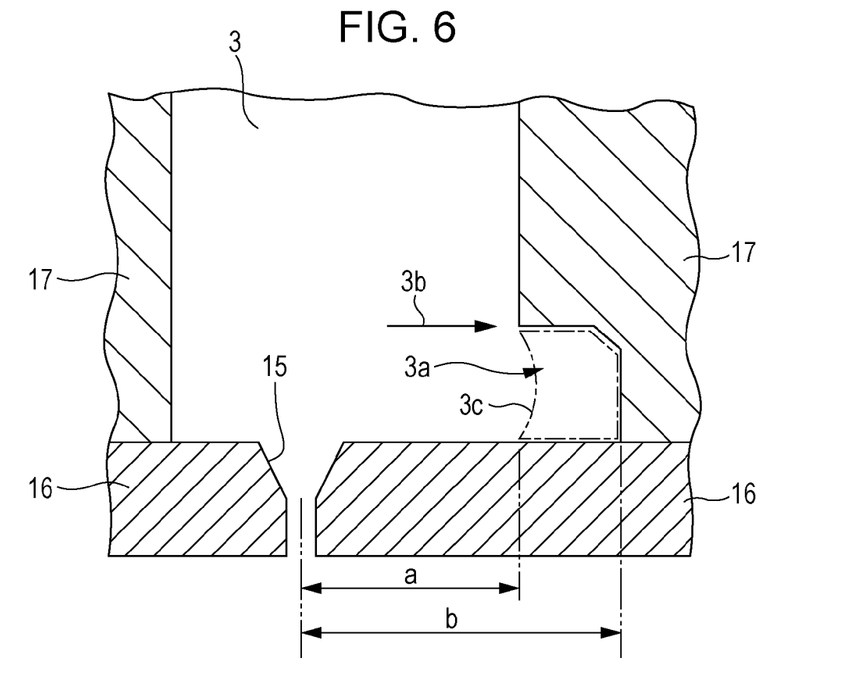
FIG. 6 is a schematic sectional view of a portion in which a communication hole is formed.

FIG. 6 is a schematic sectional view of a portion around the communication hole 3 of the recording head of an ink jet recording apparatus. In the embodiment shown in FIG. 6, an indentation 3a is formed in a portion, close to the communication hole 3, of the flow channel substrate 17 bonded to the nozzle plate 16. Consequently, the area of the cross section of the communication hole 3 parallel to the nozzle plate 16 changes suddenly (as indicated by arrow 3b in FIG. 6) at a position in a direction in which the distance between the cross section and the nozzle plate 16 increases. In addition, the cross section has the largest area at the position where the communication hole 3 and the nozzle aperture 15 are joined together (position where the flow channel substrate 17 and the nozzle plate 16 are bonded together).

In this case, in the region indicated by the dotted chain line in FIG. 6 (designated by letter 3c in FIG. 6), the flow rate of liquid running through the communication hole 3 may be reduced. The flow rate mentioned here is the flow rate of an ink composition used for normal recording or the flow rate of the ink composition when the recording head is subjected to cleaning operation (or flushing). In general, the flow rate for cleaning is higher than that for recording in the communication hole 3.

In general, air bubbles formed in an ink composition are liable to retain at a small area where the ink composition flows slowly. For example, in the flow channel substrate 17 shown in FIG. 6, air bubbles are easily retained around the indentation 3a (region indicated by the dotted chain line in FIG. 6) in the communication hole 3. Also, in the use of an ordinary ink, even if the flow rate of the ink is increased for flushing to remove air bubbles, the air bubble may not be removed in some cases. Furthermore, if air bubbles continue to remain without being removed, the ink composition may not be stably ejected.

On the other hand, the ink composition according to an embodiment of the invention can be discharged together with air bubbles formed therein effectively from flow channels. Accordingly, even if air bubbles remain in the ink composition and are retained around the indentation 3a in the communication hole 3 as shown in FIG. 6, the air bubbles can be easily removed by the stream of the ink composition formed for recording or the stream of the ink composition formed for flushing or cleaning.

Figure 7:
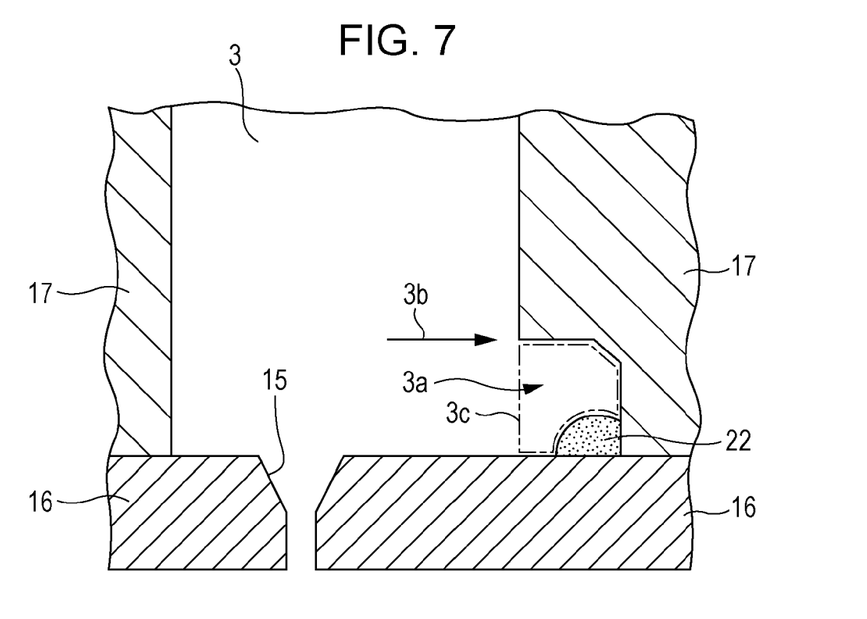
FIG. 7 is a schematic sectional view of a portion in which a communication hole is formed.

FIG. 7 is a schematic sectional view of a portion around the communication hole 3 of the recording head of an ink jet recording apparatus. The structure shown in FIG. 7 is the same as the embodiment shown in FIG. 6 in that an indentation 3a is formed in a portion, close to the communication hole 3, of the flow channel substrate 17 bonded to the nozzle plate 16, and consequently, the area of the cross section of the communication hole 3 parallel to the nozzle plate 16 changes suddenly at a position in a direction in which the distance between the section and the nozzle plate 16 increases, and that, in addition, the cross section has the largest area at the position where the communication hole 3 and the nozzle aperture 15 are joined together (position where the flow channel substrate 17 and the nozzle plate 16 are bonded together). However, in FIG. 7, a stray adhesive 22 is cured within the indentation 3a. In this case, if air bubbles are formed in an ordinary ink composition, the air bubbles are liable to be trapped at the surface of the adhesive 22. This occurs markedly in the use of an aqueous ink. Accordingly, in the use of an ordinary ink, even if the flow rate of the ink composition is increased for flushing to remove air bubbles, the air bubble may not be removed in some cases.

On the other hand, in the use of the ink composition of an embodiment of the invention, even if air bubbles remain in the ink composition and are adsorbed to the adhesive 22 as shown in FIG. 7, the air bubbles can be easily removed by the stream of the ink composition formed for recording or the stream of the ink composition formed for flushing.

As described above, the ink composition of an embodiment of the invention does not much allow air bubbles to be retained in the recording head and thus can be stably ejected even if it is used in an ink jet recording apparatus including a recording head that includes a nozzle plate having a nozzle aperture through which the ink composition is ejected, and a flow channel substrate having a communication hole acting as a flow channel through which the ink composition flows, and that has a structure in which the nozzle plate and the flow channel substrate are bonded together with an adhesive such that the communication hole communicates with the nozzle aperture.

Although it has been described that the ink composition of an embodiment of the invention is very effective in the use in a recording head in which an indentation is formed in the flow channel substrate, it will be readily appreciated that the ink composition will exhibit the same effect when it is used in an ink jet recording apparatus having a structure in which any other region through which the ink composition flows, such as a nozzle aperture, has a shape liable to retain air bubbles.

For example, when the nozzle aperture has a shape in which two cylinders having different diameters are stacked, that is, when the cylinder of the nozzle aperture at the distal end has a smaller diameter than the cylinder closer to the pressure chamber, the diameters of the cylinders may be suddenly changed around the joint of the two cylinders without being tapered. In other words, the nozzle aperture may have a shape in which the cross section of the nozzle aperture perpendicular to the direction in which the ink composition will be ejected is discontinuously reduced toward the direction in which the ink composition will be ejected. If the diameter of the nozzle aperture changes suddenly like this, the suddenly changed portion easily causes turbulence in ink stream. Thus, the portion is liable to retain air bubbles if air bubbles are formed in an ink. On the other hand, since the ink composition of an embodiment of the invention allow air bubbles to be easily removed, the ink composition can be stably ejected when it is used in a recording head having nozzle apertures having such a shape.

Even if the ink composition is used in a recording head not having the indentation 3a in which a stray adhesive has been cured and air bubbles in the ink composition are adsorbed to the surface of the cured adhesive, the air bubbles can be easily removed from the ink composition by the stream of the ink composition for recording or the stream of the ink composition for flushing.

2. Ink Jet Recording System

An ink jet recording system according to an embodiment of the invention includes the above-described ink jet recording apparatus and the above-described ink composition. The detailed structure of the ink jet recording system is as described above. Thus, the ink jet recording system allows air bubbles formed in the ink composition to be easily removed. Accordingly, air bubbles are not retained much in the system, and consequently, the ink composition can be stably ejected.

3. Examples and Comparative Examples

The invention will be further described with reference to Examples and Comparative Examples. However, the invention is not limited to the following Examples.

3.1. Preparation of Ink Compositions

Ink compositions of Examples and Comparative Examples were prepared according to the Table.

In the Table, coloring materials used were C.I. Direct Yellow 132, C.I. Direct Red 227, and C.I. Direct Blue 199. The acetylene glycol-based surfactant having an HLB value was Surfynol 104PG50 (product of Nissin Chemicals Industry Co., Ltd.) The compound expressed by general formula (1) was Newcol 1006 (product of Nippon Nyukazai) and the compound expressed by general formula (2) was the compound expressed by general formula (4).

Constituents were mixed in proportions (percent by mass) shown in the Table, and the balance of ion exchanged water was added. The mixture in a vessel was stirred with a magnetic stirrer for 2 hours, and then filtered through a membrane filter of 1 μm in pore size to yield an ink composition.

3.2. Evaluation
3.2.1. Ejection Stability

The ink compositions of Examples and Comparative Examples were separately introduced to an ink cartridge of an ink jet printer including a recording head having the structure shown in FIGS. 2, 3A to 3C, and 5 (manufactured by Seiko Epson). The ink cartridge was loaded for the yellow nozzle line of the ink jet printer. For other nozzle lines, commercially available ink cartridges were loaded. The cartridges other than the cartridge loaded for the yellow line were merely dummies and were not evaluated.

The recording head shown in FIGS. 2, 3A to 3C and 5 includes a nozzle plate having nozzle apertures through which an ink composition is ejected, and flow channel substrate having communication holes through which the ink composition flows. The nozzle plate and the flow channel substrate are bonded together in such a manner that each communication hole communicates with the corresponding nozzle aperture. The communication hole has an indentation therein at a position where the flow channel substrate is bonded to the nozzle plate, as shown in FIG. 5. At an end of the communication hole, a longitudinal pressure chamber communicates with the communication hole and extends in a direction, and the indentation extends from the communication hole in the longitudinal direction of the pressure chamber in such a manner that the area of the cross section of the communication hole parallel to the nozzle plate changes discontinuously at a position in a direction in which the distance between the cross section and the nozzle plate increases. Thus, the recording head has a shape in which air bubbles formed in the ink composition are difficult to remove.

The ink compositions of Examples and Comparative Examples were each ejected onto a glossy photo paper PGPP (manufacture by Seiko Epson) to prepare a recorded article on which a solid image was printed.

The printed solid image was observed through an optical microscope. When ink missing (portion on which the ink composition was not deposited) was not observed in the solid image, the sample was determined to be good; when ink missing was observed, the sample was determined to be bad. The results are shown in the Table. The cause of ink missing is probably that the ink composition is not sufficiently ejected through the nozzle apertures of the printer, or that droplets of

TABLE

|  |  | Example | | | | | | | Comparative Example | | | |
|---|---|---|---|---|---|---|---|---|---|---|---|---|
|  |  | 1 | 2 | 3 | 4 | 5 | 6 | 7 | 1 | 2 | 3 | 4 |
| Coloring material | C.I.DY132 | 5 | 5 | 5 | — | — | — | — | 5 | 5 | — | — |
|  | C.I.DR227 | — | — | — | 4.5 | 4.5 | — | — | — | — | 4.5 | — |
|  | C.I.DB199 | — | — | — | — | — | 5.5 | 5.5 | — | — | — | 5.5 |
| Acetylene glycol-based surfactant | Surfynol 104PG50 | 0.5 | 0.1 | 0.5 | 0.25 | 0.1 | 0.3 | 0.1 | 0.5 | — | 0.25 | 0.3 |
| Formula (1) compound | Newcol 1006 | 3 | 2 | — | 2 | 2 | — | — | — | 3 | — | — |
| Formula (2) compound | Formula (4) compound | — | — | 1 | — | — | 1 | 1 | — | — | — | — |
| Other constituents | Glycerol | 6 | 6 | 10 | 9 | 9 | 10 | 10 | 6 | 6 | 9 | 10 |
|  | Triethylene glycol | 9 | 9 | 2 | 9 | 9 | 2 | 2 | 9 | 9 | 9 | 2 |
|  | Triethylene glycol monobutyl ether | 6 | 7 | 10 | 6 | 6 | 10 | 10 | 9 | 6 | 8 | 11 |
|  | Urea | 4 | 4 | 5 | — | — | 5 | 5 | 4 | 4 | — | 5 |
|  | Triethanolamine | 0.1 | 0.1 | 0.1 | 0.1 | 0.1 | 0.1 | 0.1 | 0.1 | 0.1 | 0.1 | 0.1 |
|  | Ion exchanged water | balance | balance | balance | balance | balance | balance | balance | balance | balance | balance | balance |
| Ejection stability |  | Good | Good | Good | Good | Good | Good | Good | Bad | Bad | Bad | Bad |
| Initial filling |  | Good | Good | Good | Good | Good | Good | Good | Bad | Bad | Bad | Bad | the ink composition deviate. Thus, the occurrence of ink missing suggests that the ink composition was not stably ejected due to the presence of air bubbles in the recording head.

3.2.2. Initial Filling

Twenty completed ink jet printers, not charged with the ink composition, including the recording head having the structure shown in FIGS. 2, 3A to 3C, and 5, were prepared. Cartridges for the ink compositions of Examples and Comparative Examples were loaded to the recording heads, and each ink composition was introduced into the corresponding cartridge to fill the cartridge (initial filling). Then, the ink composition was ejected onto a glossy photo paper PGPP (manufactured by Seiko Epson) to prepare a recorded article on which a solid image was printed. The printed solid image was observed through an optical microscope. When ink missing (portion on which the ink composition was not deposited) was not observed in the solid image, the sample was determined to be good; when ink missing was observed, the sample was determined to be bad. The results are shown in the Table.

3.3. Evaluation Results

The ink compositions of Examples 1 to 7 each contained a coloring material, an acetylene glycol-based surfactant having an HLB value of 9 or less, and at least one of compounds expressed by general formula (1) or (2), and exhibited high ejection stability and initial filling. Also, it was found that the ink compositions of the Examples exhibited high ejection stability and initial filling even if the recording head has a structure that is liable to retain air bubbles.

On the other hand, the ink composition of Comparative Examples 1, 3 and 4, which did not contain a compound expressed by general formula (1) or (2), and the ink composition of Comparative Example 2, which did not contain an acetylene glycol-based surfactant having an HLB value of 9 or less, exhibited unsatisfactory ejection stability and initial filling.

These results suggest that the ink compositions of the Examples are advantageously used in ink jet recording apparatuses including a recording head that includes a nozzle plate having a nozzle aperture through which the ink composition is ejected, and a flow channel substrate having a communication hole acting as a flow channel through which the ink composition flows, and that has a structure in which the nozzle plate and the flow channel substrate are bonded together with an adhesive in such a manner that the communication hole communicate with the nozzle aperture.

The invention is not limited to the above-described embodiments, and various modifications may be made. For example, the invention includes substantially the same form as the disclosed embodiments (for example, a form including the same function and method and producing the same result, or a form having the same purpose and producing the same effect). Some elements unessential to the form of the disclosed embodiment may be replaced. The form of an embodiment of the invention includes an element producing the same effect or achieving the same object, as the form of the disclosed embodiments. The forms of the disclosed embodiments may be combined with the known art.

The entire disclosure of Japanese Patent Application No. 2012-260745, filed Nov. 29, 2012 is expressly incorporated by reference herein.

What is claimed is:

1. An ink composition used for an ink jet recording apparatus including a recording head that includes a nozzle plate having a nozzle aperture through which the ink composition is ejected, and a flow channel substrate having a communication hole acting as a flow channel through which the ink composition flows, and that has a structure in which the nozzle plate and the flow channel substrate are bonded together with an adhesive such that the communication hole communicates with the nozzle aperture, the ink composition comprising:
a coloring material;
an acetylene glycol-based surfactant having an HLB value of 9 or less; and
at least one of compounds expressed by general Formula (1): $R^1O-(CH_2-CH_2-O)_n-R^2$ and compounds expressed by general formula (2): $(R^3)_p-N-\{L-(COOM)_q\}_r$, wherein n represents an integer in the range of 4 to 8, $R^1$ represents a component selected from the group consisting of hydrogen and alkyl groups having a carbon number in the range of 1 to 3, $R^2$ represents an alkyl group having a carbon number in the range of 6 to 8, $R^3$ represents a component selected from the group consisting of hydrogen, alkyl groups, aryl groups and heterocycles, L represents a divalent or higher-valent linking group, M represents a component selected from the group consisting of hydrogen, alkali metals, an ammonium group, protonated organic amines, nitrogen-containing heterocycles, and quaternary ammonium cations, or is not present when the COO group in general formula (2) acts as a counterion of the ammonium ion including the N of general formula (2), p represents an integer in the range of 0 to 4, q represents an integer of 1 or more, and r represents an integer in the range of 1 to 4, wherein p+r is 3 or 4, and when p+r is 4, N represents a nitrogen atom of a quaternary ammonium compound, and wherein when p is 2 or more, $R^3$ may be the same as or different from each other, when q is 2 or more, M may be the same as or different from each other, and when r is 2 or more, $L-(COOM)_q$ may be the same as or different from each other.

2. The ink composition according to claim 1, wherein the communication hole has a cross section parallel to the nozzle plate, and the cross section has the largest area at the position where the communication hole joins with the nozzle aperture.

3. The ink composition according to claim 1, wherein the flow channel substrate has an indentation at a position close to the communication hole where the flow channel substrate is bonded to the nozzle plate.

4. The ink composition according to claim 3, wherein the flow channel substrate has a longitudinal pressure chamber that joins with the communication hole at one end thereof, and wherein the indentation extends from the communication hole in a longitudinal direction of the pressure chamber.

5. The ink composition according to claim 1, wherein the communication hole has a cross section parallel to the nozzle plate, and the area of the cross section changes discontinuously at a position in a direction in which the distance between the cross section and the nozzle plate increases.

6. An ink jet recording apparatus comprising:
a recording head including a nozzle plate having a nozzle aperture through which an ink composition is ejected, and a flow channel substrate having a communication hole acting as a flow channel through which the ink composition flows, the nozzle plate and the flow channel substrate being bonded together with an adhesive such that the communication hole communicates with the nozzle aperture,
wherein the ink composition contains a coloring material, an acetylene glycol-based surfactant having an HLB value of 9 or less, and at least one of compounds expressed by general formula (1): $R^1O-(CH_2-CH_2-O)_n-R^2$, and compounds expressed by general formula (2): $(R^3)_p$—N-$\{L\text{-}(COOM)_q\}_r$, wherein n represents an integer in the range of 4 to 8, $R^1$ represents a component selected from the group consisting of hydrogen and alkyl groups having a carbon number in the range of 1 to 3, $R^2$ represents an alkyl group having a carbon number in the range of 6 to 8, $R^3$ represents a component selected from the group consisting of hydrogen, alkyl groups, aryl groups and heterocycles, L represents a divalent or higher-valent linking group, M represents a component selected from the group consisting of hydrogen, alkaline metals, an ammonium group, protonated organic amines, nitrogen-containing heterocycles, and quaternary ammonium cations, or is not present when the COO group in general formula (2) acts as a counterion of the ammonium ion including the N of general formula (2), p represents an integer in the range of 0 to 4, q represents an integer of 1 or more, and r represents an integer in the range of 1 to 4, wherein p+r is 3 or 4, and when p+r is 4, N represents a nitrogen atom of a quaternary ammonium compound, and wherein when p is 2 or greater, $R^3$ may be the same as or different from each other, when q is 2 or greater, M may be the same as or different from each other, and when r is 2 or greater, L-$(COOM)_q$ may be the same as or different from each other.

7. An ink jet recording system comprising:

an ink composition containing a coloring material, an acetylene glycol-based surfactant having an HLB value of 9 or less, and at least one of compounds expressed by general formula (1): $R^1O$—$(CH_2$—$CH_2$—$O)_n$—$R^2$ and compounds expressed by general formula (2): $(R^3)_p$—N-$\{L\text{-}(COOM)_q\}_r$, wherein n represents an integer in the range of 4 to 8, $R^1$ represents a component selected from the group consisting of hydrogen and alkyl groups having a carbon number in the range of 1 to 3, $R^2$ represents an alkyl groups having a carbon number in the range of 6 to 8, $R^3$ represents a component selected from the group consisting of hydrogen, alkyl groups, aryl groups and heterocycles, L represents a divalent or higher-valent linking group, M represents a component selected from the group consisting of hydrogen, alkaline metals, an ammonium group, protonated organic amines, nitrogen-containing heterocycles, and quaternary ammonium cations, or is not present when the COO group in general formula (2) acts as a counterion of the ammonium ion including the N of general formula (2), p represents an integer in the range of 0 to 4, q represents an integer of 1 or more, and r represents an integer in the range of 1 to 4, wherein p+r is 3 or 4, and when p+r is 4, N represents a nitrogen atom of a quaternary ammonium compound, and wherein when p is 2 or more, $R^3$ may be the same as or different from each other, when q is 2 or more, M may be the same as or different from each other, and when r is 2 or more, L-$(COOM)_q$ may be the same as or different from each other; and an ink jet recording apparatus including a recording head that includes a nozzle plate having a nozzle aperture through which the ink composition is ejected and a flow channel substrate having a communication hole acting as a flow channel through which the ink composition flows, and that has a structure in which the nozzle plate and the flow channel substrate are bonded together with an adhesive such that the communication hole communicates with the nozzle aperture.

\* \* \* \* \*